United States Patent
Cialini et al.

(10) Patent No.: US 8,762,108 B2
(45) Date of Patent: *Jun. 24, 2014

(54) REAL TIME DEVICE EVALUATION

(75) Inventors: Enzo Cialini, Mississauga (CA); Aruna De Silva, Toronto (CA); Aslam F Nomani, Markham (CA)

(73) Assignee: International Business Machines Corporation, Armonk, NY (US)

( * ) Notice: Subject to any disclaimer, the term of this patent is extended or adjusted under 35 U.S.C. 154(b) by 363 days.

This patent is subject to a terminal disclaimer.

(21) Appl. No.: 13/189,094

(22) Filed: Jul. 22, 2011

(65) Prior Publication Data

US 2013/0024161 A1 Jan. 24, 2013

(51) Int. Cl.
*G06F 11/30* (2006.01)
*G06F 3/00* (2006.01)

(52) U.S. Cl.
USPC .............................. 702/186; 710/20

(58) Field of Classification Search
USPC ......... 702/186, 108, 117, 119–120, 122–123, 702/127, 182–183, 189; 710/1, 3–5, 8, 710/10–13, 15, 20–21, 33, 58, 60, 65; 711/100, 115, 117–119, 122, 167, 169; 703/13, 20–22, 24–25
See application file for complete search history.

(56) References Cited

U.S. PATENT DOCUMENTS

| | | | |
|---|---|---|---|
| 5,987,400 A | 11/1999 | Hirano | |
| 6,378,013 B1 | 4/2002 | Hanson | |
| 7,054,790 B1 | 5/2006 | Rich | |
| 7,467,263 B2 | 12/2008 | Ozaki et al. | |
| 7,784,027 B2 | 8/2010 | Harrison | |
| 7,849,180 B2 | 12/2010 | Sawyer et al. | |
| 2004/0199328 A1 | 10/2004 | Croker | |
| 2008/0319925 A1 | 12/2008 | Herold et al. | |
| 2010/0191876 A1 | 7/2010 | Muppirala et al. | |

OTHER PUBLICATIONS

Anacker et al., Performance Evaluation of Computing Systems with Memory Hierarchies, Dec. 1967, IEEE Transactions on Electronic Computers, vol. EC-16, No. 6, pp. 764-773.*

Triantafillou, P. et al., "A Comprehensive Analytical Performance Model for Disk Devices Under Random Workloads", Knowledge and Data Engineering, IEEE Transactions on; vol. 14, Issue 1; p. 140; Jan./Feb. 2002; Abstract only.

Author Unknown, "Table Space Impact on Query Optimization", DB2 Version 9 for Linux, UNIX, and Windows; http://publib.boulder.ibm.com/infocenter/db2luw/v9/topic/com.ibm.db2.udb.admin.doc/doc/c0005051.htm; Jun. 28, 2007; all pages.

(Continued)

*Primary Examiner* — Toan Le
(74) *Attorney, Agent, or Firm* — North Shore Patents, P.C.; Michele Liu Baillie

(57) ABSTRACT

A method for real time device evaluation starts a sampling tool for a sample, receives sample data from a sample data structure and sends the sample data to a target device. The method saves sample data operation results from the target device to form a sample result, and in response to determining that the sample is complete, calculates a target device transfer rate in real time using the sample result and calculates a target device overhead in real time using the target device transfer rate and the sample result, sending the target device transfer rate and the target device overhead.

11 Claims, 4 Drawing Sheets

(56) References Cited

OTHER PUBLICATIONS

Seagate, "Cheetah 10K.6 146.8 GB"; http://www.seagate.com/ww/v/index.jsp?vgnextoid=8e050debd6f78110VgnVCM100000f5ee0a0aRCRD&locale=en-US#tTabContentSpecifications; all pages, Jul. 22, 2011.

Seagate, "Cheetah 15K.7 FC 4-Gb/s 450-GB Hard Drive"; http://seagate.com/ww/v/index.jsp?name=st3450857fc-chta-15k.7-fc-450gb-hd&vgnextoid=4c68091953732210VgnVCM1000001a48090aRCRD&vgnextchannel=f424072516d8c010VgnVCM100000dd04090aRCRD&locale=en-GB&reqPage=Support#tTabContentOverview; all pages, Jul. 22, 2011.

\* cited by examiner

REAL TIME DEVICE EVALUATION

BACKGROUND

1. Technical Field

This disclosure relates generally to device performance in a data processing system and more specifically to real-time device evaluation in the data processing system.

2. Description of the Related Art

Currently disk input/output (I/O) transfer rate and overhead in a data processing system are typically derived from specifications provided by manufacturers or vendors of the disks. The transfer rate and overhead information is very valuable to applications for use in determining a cost of an I/O operation enabling the application (or administrator) to determine optimal plans for accessing data. However a challenge with this current approach is much of the storage in a data processing system is virtualized across heterogeneous disks causing difficulty in determining which disk is being leveraged. Another challenge may be obtaining transfer rate and overhead information for specific device in the absence of specifications.

SUMMARY

According to one embodiment, a computer-implemented method for real time device evaluation comprises: starting a sampling tool for a sample; receiving sample data from a sample data structure; sending the sample data to a target device; saving sample data operation results from the target device to form a sample result; in response to determining that the sample is complete, calculating a target device transfer rate in real time using the sample result; calculating a target device overhead in real time using the target device transfer rate and the sample result; and sending the target device transfer rate and the target device overhead.

According to another embodiment, a computer program product for real time device evaluation comprises a computer readable storage medium having computer readable program code embodied therewith, the computer readable program code configured to: start a sampling tool for a sample; receive sample data from a sample data structure; send the sample data to a target device; save sample data operation results from the target device to form a sample result; determine whether the sample is complete; in response to determining that the sample is complete, calculate a target device transfer rate in real time using the sample result; calculate a target device overhead in real time using the target device transfer rate and the sample result; and send the target device transfer rate and the target device overhead.

According to another embodiment, a system comprises a processor and a computer readable storage medium having computer readable program code embodied therewith, wherein when the computer readable program code is executed by the processor, causes the system to: start a sampling tool for a sample; receive sample data from a sample data structure; send the sample data to a target device; save sample data operation results from the target device to form a sample result; determine whether the sample is complete; in response to determining that the sample is complete, calculate a target device transfer rate in real time using the sample result; calculate a target device overhead in real time using the target device transfer rate and the sample result; and send the target device transfer rate and the target device overhead.

BRIEF DESCRIPTION OF THE SEVERAL VIEWS OF THE DRAWINGS

For a more complete understanding of this disclosure, reference is now made to the following brief description, taken in conjunction with the accompanying drawings and detailed description, wherein like reference numerals represent like parts.

DETAILED DESCRIPTION

Figure 1:
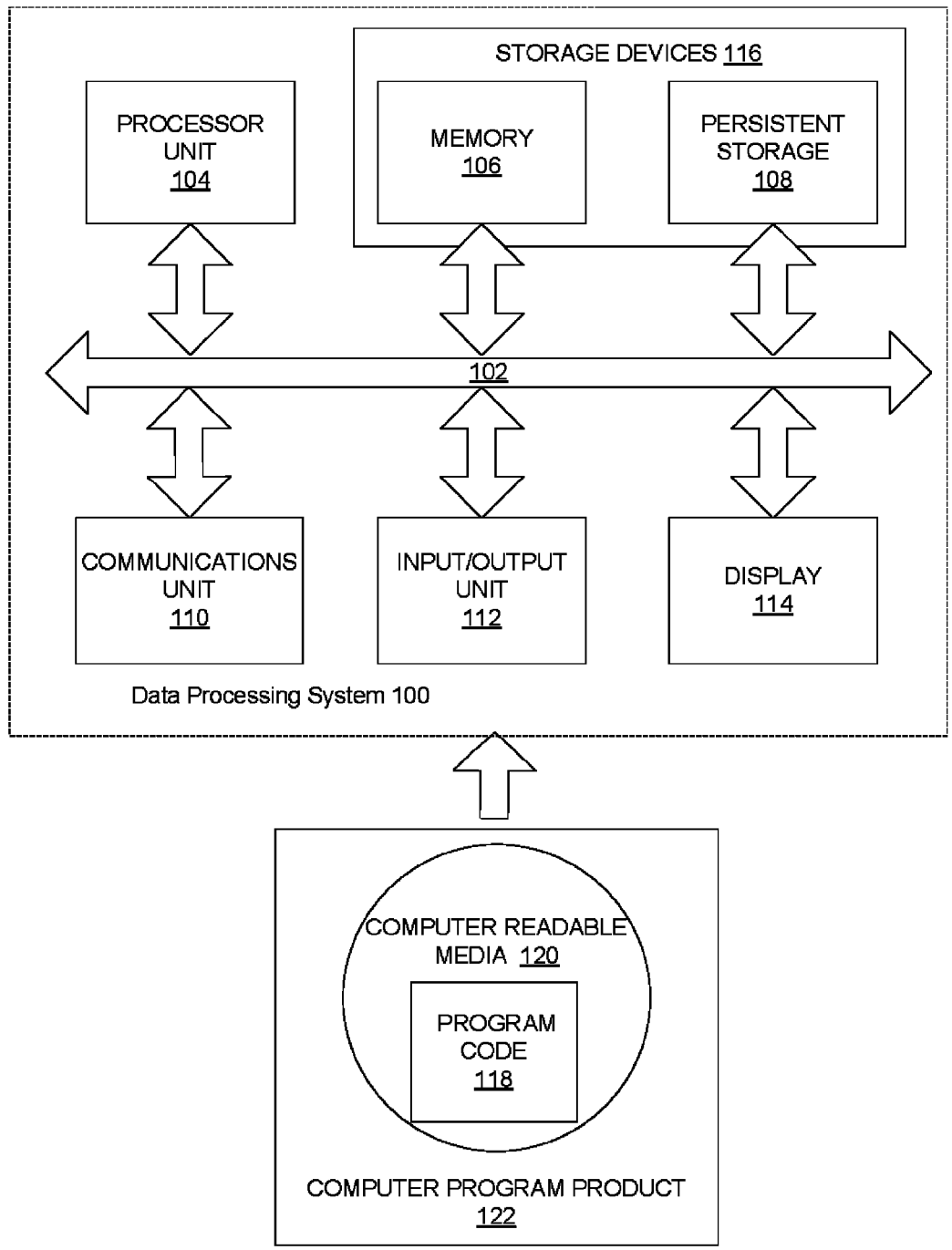
FIG. 1 is a block diagram of an exemplary data processing system operable for various embodiments of the disclosure.

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with the computer-readable program code embodied therein, for example, either in baseband or as part of a carrier wave. Such a propagated signal may take a variety of forms, including but not limited to electro-magnetic, optical or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer-readable medium may be transmitted using any appropriate medium, including but not limited to wireless, wire line, optical fiber cable, RF, etc. or any suitable combination of the foregoing.

Computer program code for carrying out operations for aspects of the present disclosure may be written in any combination of one or more programming languages, including an object oriented programming language such as Java™, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus, (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer or other programmable data processing apparatus to function in a particular manner, such that the instructions stored in the computer readable medium produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide processes for implementing the functions/acts specified in the flowchart and/or block diagram block or blocks.

Turning now to FIG. 1 a block diagram of an exemplary data processing system operable for various embodiments of the disclosure is presented. In this illustrative example, data processing system 100 includes communications fabric 102, which provides communications between processor unit 104, memory 106, persistent storage 108, communications unit 110, input/output (I/O) unit 112, and display 114.

Processor unit 104 serves to execute instructions for software that may be loaded into memory 106. Processor unit 104 may be a set of one or more processors or may be a multi-processor core, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

Memory 106 and persistent storage 108 are examples of storage devices 116. A storage device is any piece of hardware that is capable of storing information, such as, for example without limitation, data, program code in functional form, and/or other suitable information either on a temporary basis and/or a permanent basis. Memory 106, in these examples, may be, for example, a random access memory or any other suitable volatile or non-volatile storage device. Persistent storage 108 may take various forms depending on the particular implementation. For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard, a mouse, and/or some other suitable input device. Further, input/output unit 112 may send output to a printer. Display 114 provides a mechanism to display information to a user.

Instructions for the operating system, applications and/or programs may be located in storage devices 116, which are in communication with processor unit 104 through communications fabric 102. In these illustrative examples the instructions are in a functional form on persistent storage 108. These instructions may be loaded into memory 106 for execution by processor unit 104. The processes of the different embodiments may be performed by processor unit 104 using computer-implemented instructions, which may be located in a memory, such as memory 106.

These instructions are referred to as program code, computer usable program code, or computer readable program code that may be read and executed by a processor in processor unit 104. The program code in the different embodiments may be embodied on different physical or tangible computer readable media, such as memory 106 or persistent storage 108.

Program code 118 is located in a functional form on computer readable media 120 that is selectively removable and may be loaded onto or transferred to data processing system 100 for execution by processor unit 104. Program code 118 and computer readable media 120 form computer program product 122 in these examples. In one example, computer readable media 120 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer readable media 120 also may take the form of a persistent storage, such as a hard drive, a thumb drive, or a flash memory that is connected to data processing system 100. The tangible form of computer readable media 120 is also referred to as computer recordable storage media. In some instances, computer readable media 120 may not be removable.

Alternatively, program code 118 may be transferred to data processing system 100 from computer readable media 120 through a communications link to communications unit 110 and/or through a connection to input/output unit 112. The communications link and/or the connection may be physical or wireless in the illustrative examples. The computer readable media also may take the form of non-tangible media, such as communications links or wireless transmissions containing the program code.

In some illustrative embodiments, program code 118 may be downloaded over a network to persistent storage 108 from another device or data processing system for use within data processing system 100. For instance, program code stored in a computer readable storage medium in a server data processing system may be downloaded over a network from the server to data processing system 100. The data processing system providing program code 118 may be a server computer, a client computer, or some other device capable of storing and transmitting program code 118.

The different components illustrated for data processing system 100 are not meant to provide architectural limitations to the manner in which different embodiments may be implemented. The different illustrative embodiments may be implemented in a data processing system including components in addition to or in place of those illustrated for data processing system 100. Other components shown in FIG. 1 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 100 may be any hardware apparatus that may store data. Memory 106, persistent storage 108 and computer readable media 120 are examples of storage devices in a tangible form.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache such as found in an interface and memory controller hub that may be present in communications fabric 102.

According to an illustrative embodiment, a computer-implemented method for real time device evaluation using a sampling tool saves sample data operation results from a target device to form a sample result, and in response to determining that the sample is complete, calculates a target device transfer rate in real time using the sample result and calculates a target device overhead in real time using the target device transfer rate and the sample result, and send the target device transfer rate and the target device overhead to a requester or other destination wherein the requester or destination may be a user or an application (component of a data processing system).

Using data processing system 100 of FIG. 1 as an example, an illustrative embodiment provides, the computer readable program code for the computer-implemented method stored in memory 106, executed by processor unit 104, for real time device evaluation. Processor unit 104 starts a sampling tool for a sample, receives sample data from a sample data structure in storage devices 116 and sends the sample data to a target device including input/output unit 112 or attached thereto. Processor unit 104 saves sample data operation results from the target device in storage devices 116 to form a sample result, and in response to determining that the sample is complete, calculates a target device transfer rate in real time using the sample result and calculates a target device overhead in real time using the target device transfer rate and the sample result. Processor unit 104 sends the target device transfer rate and the target device overhead to a user or an application (a system component).

In an alternative embodiment, program code 118 containing the computer readable program code for the computer-implemented method may be stored within computer readable media 120 as computer program product 122. In another illustrative embodiment, the process for real time device evaluation may be implemented in a system comprising a communications fabric, a memory connected to the communications fabric, wherein the memory contains computer executable program code, a communications unit connected to the communications fabric, an input/output unit connected to the communications fabric, a display connected to the communications fabric, and a processor unit connected to the communications fabric. The processor unit of the system executes the computer executable program code to direct the system to perform the method.

Figure 2:
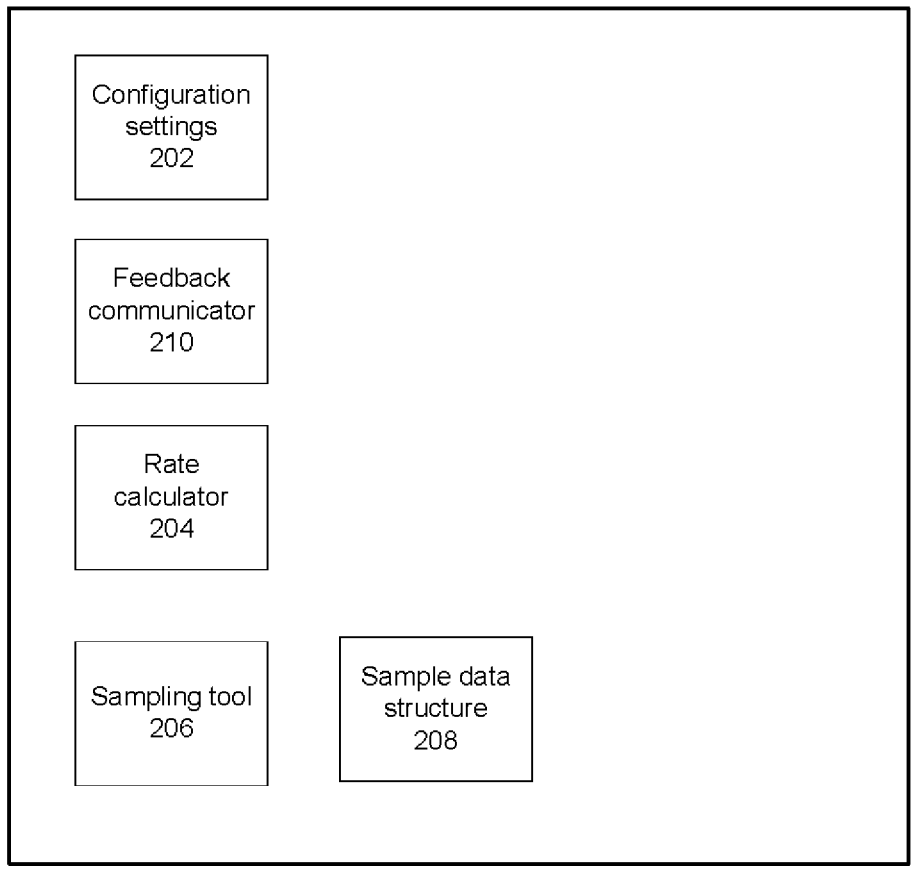
FIG. 2 is a block diagram of an evaluation system in accordance with various embodiments of the disclosure.

With reference to FIG. 2 a block diagram of an evaluation system in accordance with various embodiments of the disclosure is presented. Evaluation system 200 of FIG. 2 is an example of a device performance evaluation system in accordance with embodiments of this disclosure.

Evaluation system 200 typically relies on an underlying data processing system such as data processing system 100 of FIG. 1 for operational support and comprises a number of components including configuration settings 202, rate calculator 204, sampling tool 206, sample data structure 208 and feedback communicator 210.

Configuration settings 202 provide a capability to manage operational settings of evaluation system 200. For example, elements of configuration settings 202 typically comprises initialization values such as a test data sample size expressed in a number of gigabytes (GB), data access patterns (direct I/O configuration of a target device, no cache used), target disk identifier, a number of reads or writes and a type of operation (read or write) for a sample run. Storage location information (for sample input and output results) and destination of output may also be specified. Other information can also be included to provide control or descriptive information associated with a sample run.

Rate calculator 204 provides a capability to calculate a transfer rate for a target disk and an associated overhead value using sample data in real time. Rate calculator 204 includes a method for determining, in real time, the transfer rate and the overhead within an overall I/O cost using the results obtained from sampling tool 206 for data maintained in sample data structure 208. Rate calculator 204 is enabled to separate the transfer rate and the overhead for an overall I/O cost for an application.

Sampling tool 206 provides a capability of managing usage of test data (sample data) including interfacing with target devices, sample data structure 208, rate calculator 204 and feedback communicator 210. Sampling tool 206 obtains data from sample data structure 208 used as input to a target device, receives I/O response results from the target device which are stored in sample data structure 208 for subsequent processing by rate calculator 204.

Sample data structure 208 provides a capability of storing data used as input (sent to a target device), data received in response to performance of I/O operations (on the target device). Sample data structure 208 may also store historical information associated with previous execution of sampling tool 206 for a target device in addition to current responses for devices being measured. Configuration settings 202 may also be stored in sample data structure 208. Sample data structure 208 is a memory implemented in various forms as needed or available in a data processing system. Sample data structure 208 need not be physically local to a target device or other components of evaluation system 200 and can be accessed using a communication network.

Feedback communicator 210 provides a communication capability for interfacing evaluation system 200 with other system components locally or remotely. For example, feedback communicator 210 enables communication of results using sampling tool 206 to a user or other application.

Figure 3:
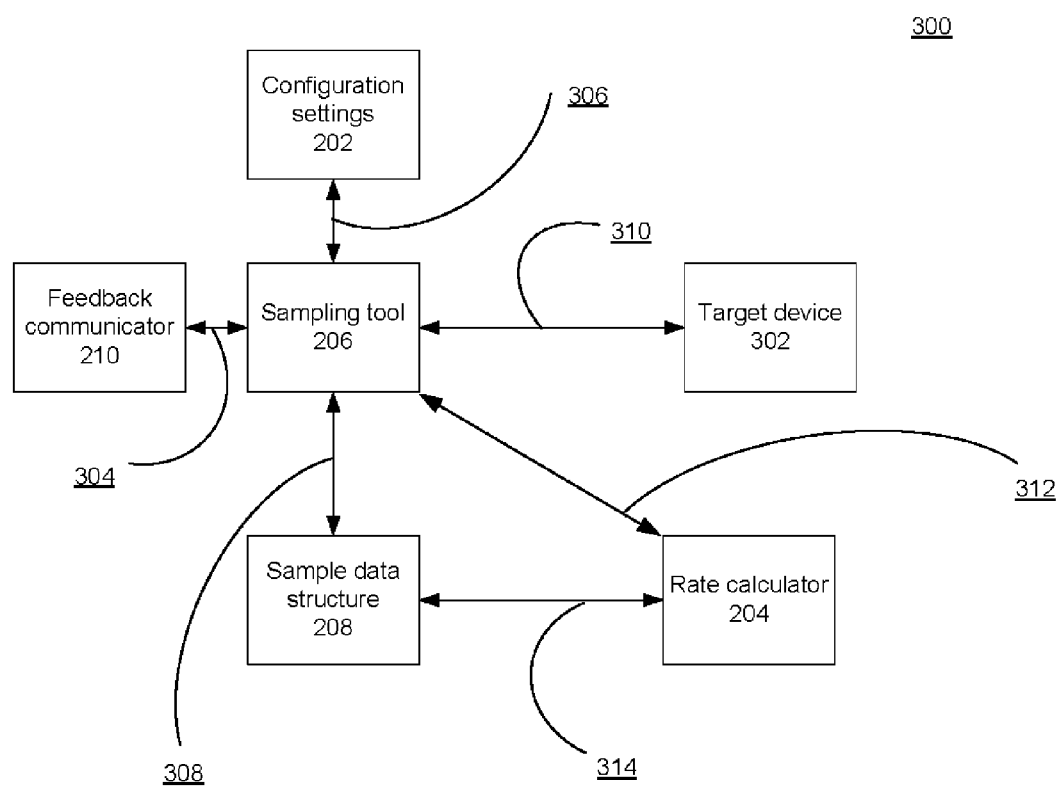
FIG. 3 is a block diagram of data flows within the evaluation system of FIG. 2, in accordance with one embodiment of the disclosure.

With reference to FIG. 3, a block diagram of data flows within the evaluation system of FIG. 2, in accordance with one embodiment of the disclosure, is presented. Data flows 300 is an example of operation data flow among components configuration settings 202, rate calculator 204, sampling tool 206, sample data structure 208 and feedback communicator 210 (FIG. 2) and target device 302.

A previous solution in a steaming audio/video domain provides a method for measuring a data transfer rate of a storage device in which data is sent via an in-memory "virtual buffer" for a specified data access pattern. A measured data transfer rate is compared with a user specified data transfer rate. The difference between the measured rate and the specified (base-line) rate is used to tune the virtual I/O buffer of an application. A similar example measures time to service an I/O request of a known I/O size between a physical storage device and a device driver layer. The measured service time is then compared with published specifications of disk drives and results of the comparison are used to tune device driver attributes such as queue depth. Another current variation of previous solutions measures certain performance metrics, performing historical analysis of collected data to determine target performance values, and basing decisions on a difference between measured versus historical targets. In this example, a performance collection model uses sampling transfer rate agents to only measure transfer rates at specific points in the I/O path of a host bus adapter (HBA), storage area network (SAN) ports, and a storage back-end. The example does not measure transfer rates at an application layer nor measure end-to-end values as described in the current disclosure.

Yet another example provides a performance metering system, in which a metering agent sets certain performance indicators such as cache size or a clock rate of an I/O controller. Changes to the values from a base-line are then measured.

In another example of a current solution a unified framework for modeling performance of constant angular velocity (CAV) magnetic disks, constant linear velocity (CLV) optical disks or zoned disks using characteristics including angular and linear velocity, storage capacity, and transfer rate is provided. The framework is proposed to create a unified model in which the stated characteristics are applied to systems using one or more disk types to determine trade-offs between using differing disk types.

Another example of a current solution allocates aggregates (which is a physical slice of a physical disk device) to a volume (which is a virtual storage entity comprising one or more aggregates). The example solution manages placement of aggregates in a volume to maximize I/O performance by selecting aggregates from multiple (for example, load balancing) among multiple storage devices, but does not measure I/O performance at a host level in real time as described in the current disclosure.

Another example describes an interactive graphical user interface (GUI) to display performance of an application. The GUI described provides an interface representative of component performance including usability features to quickly highlight hot spots and trigger alerts. However, the example does not measure I/O performance at a host level in real time as in the current disclosure.

Embodiments of the disclosure measure end-to-end I/O response time (for example, from an application through an operating system and device driver layer to a storage device). An embodiment is capable of separating an overhead value and a transfer rate from within an overall I/O cost. Overhead and transfer rate are typically used by applications such as data base managers to optimize I/O costing models.

Flow 304 represents input of requests to a sampling tool to commence a sampling session against as specific target device using sample data. Flow 304 also represents receiving of results from the sampling tool suitable for transmission to a designated user, application or other system component.

Flow 306 represents correspondence of information in previously saved configuration values used to alter processing behavior of the sampling tool and associated sampling session. Typically configuration settings are obtained for each invocation of the sampling tool but may be bypassed for repeated operations, for example, when performing sample sessions using a same sample data with a same target device.

Flow 308 represents data exchanges between the sampling tool and a data structure storing data used with a sample session or across sample sessions. Sample data flows from the data structure to the sampling tool for use with target device 302. Results of I/O operations on target device 302 using the sample data then flows back to the data structure through the sampling tool.

Flow 310 represents data traffic between the sampling tool and target device 302. Sample data flows from the sampling tool causing I/O operations to be performed on target device 302 which are measured and reported back to the sampling tool. In one example, I/O operations are performed in a sequential order.

Flow 312 represents communication between the sampling tool and a calculation means. For example, a rate calculator receives a request from the sampling tool to provide calculations for a transfer rate and an overhead using sample data associated with a sampling session. The rate calculator provides results of the requested calculation to the sampling tool for transmission to a user, application or another component, directly to the sample data structure or both.

Flow 314 represents data traffic between a sample data structure in a memory location and a rate calculation. The rate calculator consumes data flowing from the sample data structure while calculation results are sent to the memory for storage and subsequent use.

Figure 4:
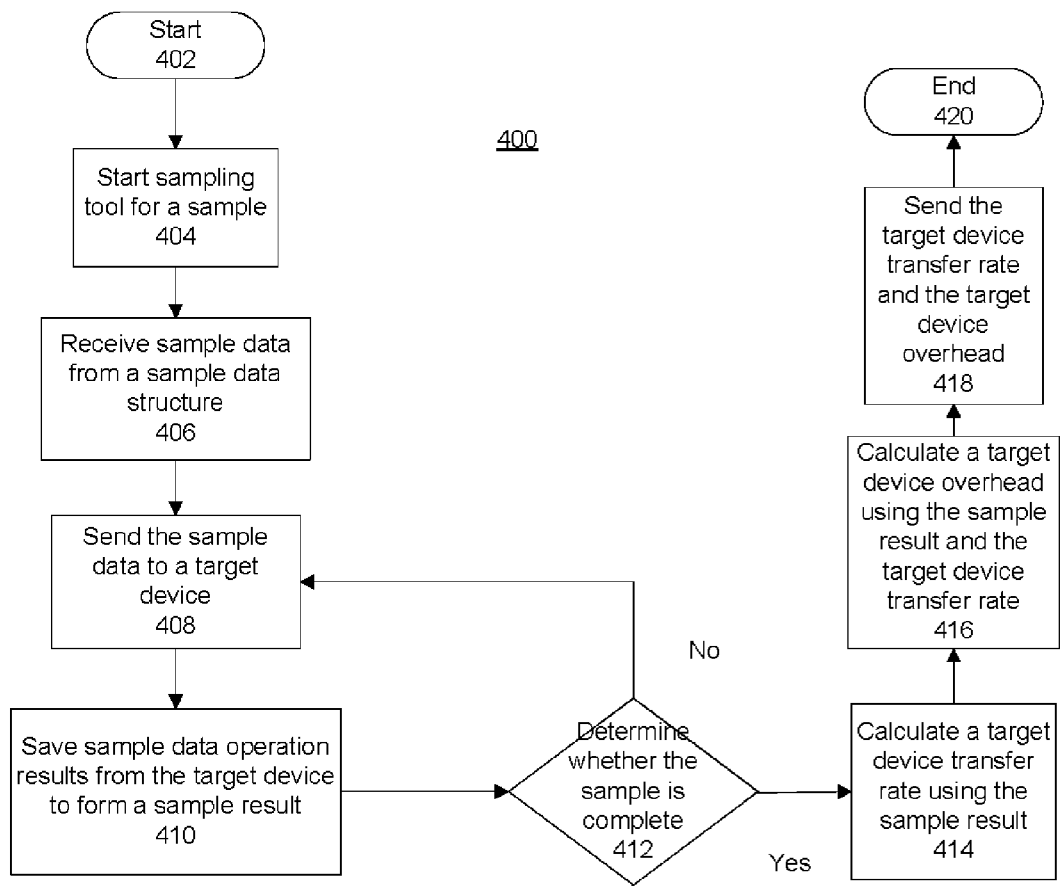
FIG. 4 is a flowchart of a process using the evaluation system of FIG. 2, in accordance with one embodiment of the disclosure.

With reference to FIG. 4 a flowchart of a method using the evaluation system of FIG. 2, in accordance with one embodiment of the disclosure is presented. Process 400 is an example of a sample session process using evaluation system 200 of FIG. 2.

Applications such as database managers typically leverage disk transfer rates and overhead as a means to compute efficient plans for accessing required data to solve a request. The transfer rate and overhead are typically obtained using specifications provided by a vendor of a disk being used. However, when using a virtualized resource, identifying which disks on which the data may reside is not obvious and the disks may change over time. The disclosed method 400 enables obtaining transfer rates and overhead in real time without knowing vendor provided disk specifications.

Method 400 provides a capability to empirically determine the input/output (TO) rates such that measures for I/O transfer rate and I/O overhead can be determined. A determination of these values uses actual I/O rates enabling applications, such as a database manager, to better determine more optimal methods for particular operations using actual I/O rates.

For example, a current non-empirical method used by a database management system calculates transfer rate and overhead using a vendor specification for a device. Transfer rate is an estimate in milliseconds of the time required read one page of data into memory. Assuming a file resides on one physical disk, a traditional method for calculating this value using disk specifications determines transfer rate as (1/spec_rate)*1000/1024000*read_size, where spec_rate represents disk specifications for the transfer rate in megabytes (MB) per second. Using the spec_rate as a divisor provides seconds per MB. The intermediate result is multiplied by 1000 milliseconds per second, divided by 1024000 bytes per MB. The read_size in bytes is then used as a multiplier (for example 4096 bytes for a 4 kilobyte (KB) read).

Using the same example of the traditional method an overhead value is determined. Overhead is an estimate in milliseconds of time required after a read is initiated but before any file data is read into memory. This overhead activity includes file I/O controller overhead as well as disk latency time, which includes the disk seek time.

Overhead, using the example, is calculated as average seek time in milliseconds plus (0.5*rotational time). The value of 0.5 represents an average overhead of one half of a rotation. Rotational latency is calculated in milliseconds for each full rotation as (1/RPM)*60*1000. A value of 1 is divided by rotations per minute to obtain minutes per rotation, multiplied by 60 seconds per minute and by 1000 milliseconds per second. Average seek time is an assumed value.

Method 400 includes an assumption of overhead being equivalent regardless of the read size. This assumption is valid assuming one half of a disk rotation is not impacted by read size which is a reasonable assumption for small reads across large disks and storage features that avoid actual physical reads from the disk will be disabled (for example, caching).

An illustrative embodiment uses a single disk on both internal and external storage to validate disk specifications versus an implementation of the disclosed method. A sampling tool of a representative application is used to perform IO sampling. In the example, I/O size was set to 4K and 128K while sample size was 40 GB resulting in a 327680 reads of 128K each. Specifications for transfer rate are determined using sequential activity. I/O sampling for overhead leveraged an access pattern bypassing disk controller cache hits to allow results comparable with actual disk specifications. Direct I/O was configured for the file system similar to database best practices.

Method 400 starts (402) and starts a sampling tool for a sample (404). The sampling tool is typically started as a result of a user or application initiated request for a set of sample data for a specific target device.

Method 400 receives sample data from a sample data structure (406). The sampling tool started previously receives the sample data from a storage location containing a sample data structure including sample data. Other data contained within the sample data structure, including configuration information and sample data results, is used in method 400 to manage the sample processing operation.

Having obtained the sample data in the sampling tool, method 400 sends the sample data to a target device (408). The target device is typically identified in a configuration setting or as part of the request. The target device performs the operations associated with resolving the I/O requests in the sample data. Method 400 receives output from the target device and saves sample data operation results from the target device in the sample data structure to form a sample result (410). Sample data operation results may optionally be saved equally well in other storage locations as required.

Method 400 determines whether the sample is complete (412). When a determination is made that the sample is complete, a "yes" result is obtained. When a determination is made that the sample is not complete, a "no" result is obtained. In response to obtaining a "no" result (412), method 400 loops back to perform 408 as before. In response to obtaining a "yes" result (412), method 400 calculates a device transfer rate using the sample result (414). An empirical formula using a sampling of I/O read rates enables calculation of a transfer rate and an overhead value. Let X represent a time for a large read (assume 128K for this example) and let Y represent a time for a small read (assume 4K for this example). A transfer rate for 124 k (a difference between a 128K read size and a 4K read size) is calculated using an expression of $$\left(\sum_{i=1}^{n} Xi - \sum_{i=1}^{n} Yi\right)\bigg/n.$$

The transfer rate for a large read, wherein the large read is defined as a size of a large read minus a size of a small read, is calculated accordingly as a difference between a sum of large read total I/O time and a sum of small read total I/O time divided by the number of reads.

A transfer rate for 4 k is calculated using an expression of the transfer rate for 124 k*(4/124). Accordingly the calculating of a transfer rate for a small read is represented as the transfer rate for a large read multiplied by a value representing the size of the small read divided by a value representing the size of the large read minus the size of the small read.

Method 400 calculates a device overhead using the sample result and the device transfer rate (step 416). An overhead value is calculated using the expression $$\left(\sum_{i=1}^{n} Xi - (\text{transfer rate for } 4K*n)\right)\bigg/n.$$

The transfer rate for 4K is used from the transfer rate calculated previously. Accordingly the overhead is dependent on the transfer rate, but not the read size. A corresponding implementation can be used for write I/O activity with the sample data factoring in write I/O operations.

Method 400 sends the device transfer rate and the device overhead (418) and terminates thereafter (420). The results may be sent to a user or an application (other system component) as required for use in costing determinations. In addition the results may be stored in a memory, such as sample data structure, for later use.

The following example provides a typical indication of approximation of the disclosed process in comparison with a vendor provided specification. The representation shown enables use of the real time calculated values of disclosed process rather than vendor provided specifications.

| Value | Calculated Result | Vendor Specification | Difference |
|---|---|---|---|
| Disk 1 | | | |
| Transfer rate | 0.06 ms | 0.51-0.093 ms | 0% |
| Overhead | 7.04 ms | 7.7 ms | 8% |
| Disk 2 | | | |
| Transfer rate | 0.036 ms | 0.019-0.032 ms | 1% |
| Overhead | 5.95 ms | 5.4 ms | 10% |

The following sample results were used to provide the summary results of the previous table for disk 1 and disk 2.

| | Total I/O time (327,680 iterations) | | |
|---|---|---|---|
| I/O size | Sequential read (ms) | Controller cache miss reads (ms) | Total I/O size = I/O size * # of iterations |
| Disk 1 | | | |
| 4k | 49014.63 | 1319514.25 | 1.28 GB |
| 128k | 722502.46 | 2340920.10 | 40 GB |
| Disk 2 | | | |
| 4k | 73959.04 | 81287.35 | 1.28 GB |
| 128k | 443254.75 | 2013270.15 | 40 GB |

Thus is presented in one illustrative embodiment, a computer-implemented method for real time device evaluation starts a sampling tool for a sample, receives sample data from a sample data structure and sends the sample data to a target device. The computer-implemented method saves sample data operation results from the target device to form a sample result, and in response to determining that the sample is complete, calculates a target device transfer rate in real time using the sample result and calculates a target device overhead in real time using the target device transfer rate and the sample result, and sending the target device transfer rate and the target device overhead.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing a specified logical function. It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, and other software media that may be recognized by one skilled in the art.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product for real time device evaluation, the computer-program product comprising:
a non-transitory computer readable storage medium having computer readable program code embodied therewith, the computer readable program code configured to:
start a sampling tool for a sample;
receive sample data from a sample data structure;
send the sample data to a target device;
save sample data operation results from the target device to form a sample result;
determine whether the sample is complete;
in response to determining that the sample is complete, calculate a target device transfer rate in real time using the sample result, further configured to:
calculate a transfer rate for a large read, wherein the large read comprises a size of a large read minus a size of a small read, wherein the transfer rate for a large read comprises a difference between a sum of large read total I/O time and a sum of small read total I/O time divided by a number of reads; and
calculate a transfer rate for a small read as the transfer rate for the large read multiplied by a value representing the size of the small read divided by a value representing the size of the large read minus the size of the small read;
calculate a target device overhead in real time using the target device transfer rate and the sample result; and
send the target device transfer rate and the target device overhead to a requester.

2. The computer program product of claim 1, wherein the computer readable program code configured to start the sampling tool for the sample is further configured to:
initialize the sampling tool using information for configuration settings.

3. The computer program product of claim 1, wherein the computer readable program code configured to receive the sample data from the sample data structure is further configured to:
receive the sample data comprising a set of differing I/O operation sizes, wherein the set of differing I/O operation sizes comprises one or more read I/O operations or one or more write I/O operations.

4. The computer program product of claim 1,
wherein the requester comprises a user or an application.

5. The computer program product of claim 1, wherein the computer readable program code configured to receive the sample data from the sample data structure is further configured to:
receive the sample data comprising write information in place of reads.

6. A computer program product for real time device evaluation, the computer-program product comprising:
a non-transitory computer readable storage medium having computer readable program code embodied therewith, the computer readable program code configured to:
start a sampling tool for a sample;
receive sample data from a sample data structure;
send the sample data to a target device;
save sample data operation results from the target device to form a sample result;
determine whether the sample is complete;
in response to determining that the sample is complete, calculate a target device transfer rate in real time using the sample result;
calculate a target device overhead in real time using the target device transfer rate and the sample result, further configured to: divide a difference between a total I/O time for large reads and a product of a transfer rate for small reads and a number of reads, by the number of reads; and
send the target device transfer rate and the target device overhead to a requester.

7. A system, comprising:
a processor; and
a computer readable storage medium having computer readable program code, wherein when the computer readable program code is executed by the processor, causes the system to:
start a sampling tool for a sample;
receive sample data from a sample data structure;
send the sample data to a target device;
save sample data operation results from the target device to form a sample result;
determine whether the sample is complete;
in response to determining that the sample is complete, calculate a target device transfer rate in real time using the sample result, further configured to:
calculate the transfer rate for a large read, wherein the large read comprises a size of a large read minus a size of a small read, wherein the transfer rate for the large read comprise a difference between a sum of large read total I/O time and a sum of small read total I/O time divided by a number of reads; and
calculate a transfer rate for a small read as the transfer rate for a large read multiplied by a value representing the size of the small read divided by a value representing the size of the large read minus the size of the small read;
calculate a target device overhead in real time using the target device transfer rate and the sample result; and
send the target device transfer rate and the target device overhead to a requester.

8. The system of claim 7, wherein the processor executing the computer readable program code to start the sampling tool for the sample further causes the system to:
initialize the sampling tool using information for configuration settings.

9. The system of claim 7, wherein the processor executing the computer readable program code to receive the sample data from the sample data structure further causes the system to:
receive the sample data comprising a set of differing I/O operation sizes, wherein the set of differing I/O operation sizes comprises one or more read I/O operations or one or more write I/O operations.

10. The system of claim 7,
wherein the requester is one of a user or an application.

11. A system, comprising:
a processor; and
a computer readable storage medium having computer readable program code, wherein when the computer readable program code is executed by the processor, causes the system to:
start a sampling tool for a sample;
receive sample data from a sample data structure;
send the sample data to a target device;

save sample data operation results from the target device to form a sample result;
determine whether the sample is complete;
in response to determining that the sample is complete, calculate a target device transfer rate in real time using the sample result;
calculate a target device overhead in real time using the target device transfer rate and the sample result, further configured to: divide a difference between a total I/O time for large reads and a product of a transfer rate for small reads and a number of reads, by the number of reads; and
send the target device transfer rate and the target device overhead to a requester.

* * * * *